TAPE TRANSPORT DEVICE WITH FRICTIONAL CONTROL MEANS

Filed Oct. 3, 1963 2 Sheets-Sheet 1

INVENTORS
BEN C. WANG
NORMAN P. GRUCZELAK
THOMAS W. LAWSON
BY
Robert G. Clay
ATTORNEYS TAPE TRANSPORT DEVICE WITH FRICTIONAL CONTROL MEANS
Filed Oct. 3, 1963 2 Sheets-Sheet 2
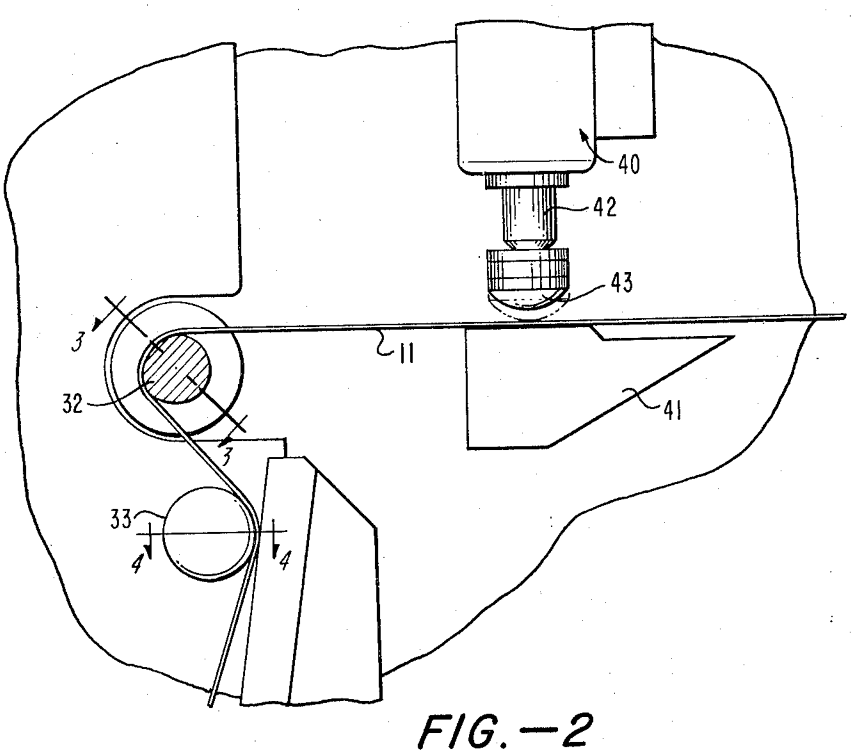
FIG.—2
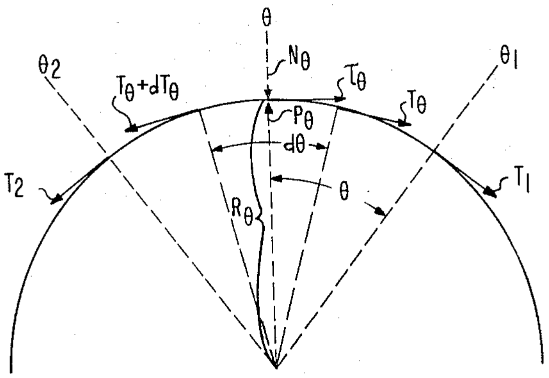
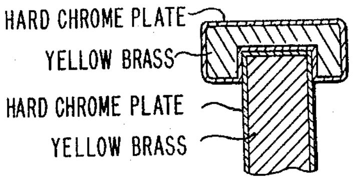
FIG.—3
FIG.—5
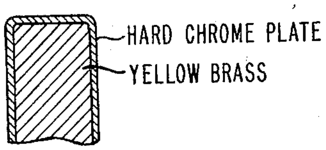
FIG.—4
INVENTORS
BEN C. WANG
NORMAN P. GRUCZELAK
THOMAS W. LAWSON
BY Robert G. Clay
ATTORNEYS

1

3,294,331
TAPE TRANSPORT DEVICE WITH FRICTIONAL CONTROL MEANS

Ben C. Wang and Norman P. Gruczelak, Los Angeles, and Thomas W. Lawson, Culver City, Calif., assignors to Ampex Corporation, Redwood City, Calif., a corporation of California Filed Oct. 3, 1963, Ser. No. 313,535
13 Claims. (Cl. 242—55.12)

This invention relates to bidirectional intermittently operated tape transport systems and more particularly to devices for providing improved control of tape movement in such systems.

Tape transport systems for use with digital computers must satisfy extreme operating requirements in order to transfer data at high speeds as demanded by the associated computer system. These tape transport systems must be capable of bringing the tape to full speed within a few milliseconds after a start command has been presented and must similarly stop the tape when an appropriate command signal is received. Nevertheless, the tape handling must be gentle and uniform during these transitory states.

A number of precision tape transport systems have been developed to meet the increasingly stringent performance characteristics which are sought for modern applications. A particularly suitable form of such system is shown and described in a copending U.S. patent application Ser. No. 273,681, entitled Servo System for Tape Transports, filed by Harold A. Kurth on April 17, 1963, and assigned to the assignee of this application. The aforementioned application describes a digital tape transport system in which low inertia compliance mechanisms in the form of tapered vacuum chambers are disposed in symmetrical fashion for bidirectional transport of the tape. Tape loops are formed in each of the vacuum chambers under differential pressure, and these loops are maintained by the reel servo systems at optimum lengths for rapid reversal of tape direction. The tape loops are therefore unequal in length, and are subject to tension differences because of the varying cross sections of the tapered vacuum chambers.

The tape is driven bidirectionally by the use of two capstan and pinch roller arrangements. When the tape is to be stopped, the driving pinch roller is disengaged, and the frictional force along the tape path operates as a main decelerating force. Under certain conditions, frictional forces in the tape path are not sufficient to overcome the unbalanced forces acting on the unequal tape loops, which in turn results in a net force on the tape in the direction of tape travel. Therefore, the net retarding force exerted by conventional frictional elements in the tape path may not be sufficient to gradually slow the tape to a stop within a prescribed interval after initiation of a stop command. Additionally, if the tape is stopped with unequal loop lengths in the two chambers the unequal tensions may result in tape creep if the friction is inadequate.

However, the mere addition of a frictional element at a point in the tape path is not desirable because the presence of high frictional forces in the downstream direction of tape travel may cause the tape to buckle in the region between the drive capstan and the downstream frictional element. Additionally, frictional elements constantly acting on a tape moving at high speed may generate heat to such an extent that the tape surface is affected.

It is therefore an object of this invention to improve the operation of a tape transport mechanism by improved control of tape movement.

It is another object of this invention to provide more uniform tape movement and tape tension in a tape transport system when the tape is being accelerated or decelerated.

2

It is still another object of this invention to prevent tape creep in a tape transport mechanism utilizing tapered vacuum chambers.

It is still a further object of this invention to provide an improved tensioning guide mechanism for use in a tape transport system.

Yet another object of the invention is to provide an improved tensioning guide mechanism wherein the tensioning guides prevent excessive heating because of frictional forces.

Devices in accordance with this invention provide substantially unidirectional frictional elements in engagement with the driven member of a bidirectional tape or web transport system. As applied to a tape transport system as previously described, devices according to the invention provide greater frictional action adjacent a vacuum chamber when tape is being drawn out of such chamber than when it is being fed in. In a two chamber system, this increased friction is automatically provided at the chamber from which tape is being withdrawn by the capstan and is automatically reduced at the chamber to which tape is being fed so that the same result is provided for either tape direction. This unilateral frictional action retards the trailing part of a decelerating tape when the tape is to be stopped, without substantially opposing movement of the leading part. Thus the tape is uniformly decelerated without buckling or catching. Unidirectional frictional devices in accordance with the invention also prevent creeping of a tape from one chamber to the other during static operating modes in which varying tensions are exerted on the tape.

In a specific example of a system in accordance with the invention, a pair of partially unidirectional frictional means are each positioned along the tape path between a vacuum chamber and the associated capstan drive means. In accordance with one aspect of this invention, the frictional means may comprise staggered first and second fixed posts around which the tape is wrapped in opposite directions to define a sinuous path between the vacuum chamber and the capstan. The tape is turned principally about the second post, and the first post is so positioned as to provide an increased wraparound angle about the second post, with the path between the second post and the capstan being substantially linear but the path between the second post and the vacuum chamber being sinuous. Thus when the tape is being withdrawn from a chamber, a greater frictional restraint is exerted to facilitate stopping. When the tape is being fed into a chamber from the capstan drive system, the two posts introduce minimum friction, thus preventing tape buckling. In other words, each pair of posts provides a self-adjusting frictional force which is dependent on the direction of tape travel.

In accordance with a significant feature of this invention, the two fixed posts are arranged to avoid excessive frictional heating despite extremely high tape speeds. The first post may be larger in diameter than the second post about which the high wraparound angle is maintained. The surface of the second post which bears on the tape is given an involute or logarithmic spiral shape providing a larger contact area where the angle of wrap, and consequently the normal force, increases. This relationship establishes a more even pressure distribution throughout the angle of wrap and reduces high localized heat dissipation. Also, the posts are made from a highly heat conductive material, preferably a yellow brass alloy so that the heat generated is quickly conducted away from the contacting surface to be dissipated to the surrounding air or to a heat sink conductively coupled to the surface. In addition, the surface of the post is coated with a thin hard coat of chromium alloy and lapped to provide a smooth wear resistant surface without substantially affecting heat conduction.

A better understanding of the invention may be had by reference to the following description, taken in connection with the accompanying drawings, in which:

FIG. 2 is an enlarged front view, in partial section, of a frictional means in accordance with the invention, wherein for clarity a guiding flange is not shown on the second fixed post of the staggered post arrangement;

FIG. 3 is a partial sectional view of the post of FIG. 2 taken along the line 3—3 of FIG. 2;

FIG. 4 is a partial sectional view of the first fixed post taken along the line 4—4 of FIG. 2; and FIG. 5 is a diagrammatic representation of force and frictional relationships which is useful in explaining the invention.

Figure 1:
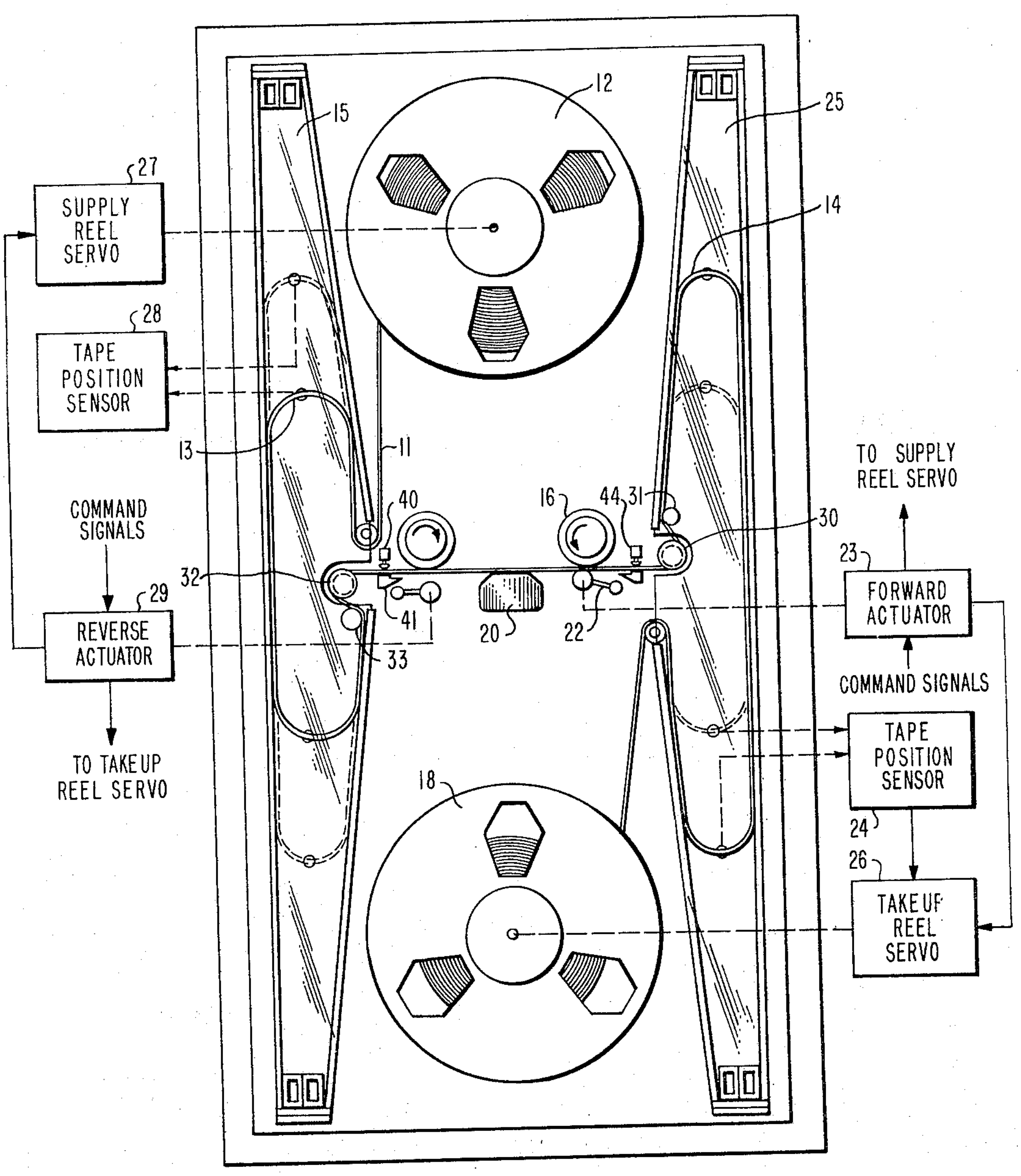
FIG. 1 is a front elevation view of a tape transport system in accordance with the invention.

Referring now to FIG. 1, the basic arrangement of an example of a device in accordance with the invention is illustrated. As described in detail in the aforementioned patent application of Harold A. Kurth, tape 11 is fed from a supply reel 12 into a vacuum chamber 15. The tape is assumed to be driven as shown in FIG. 1 in the forward direction, as indicated by the arrow drawn on capstan 16, by means of a pinch roller 22 which is controlled by forward actuator 23. The tape is fed into vacuum chamber 25 and then onto takeup reel 18. Supply reel 12 and takeup reel 18 are respectively driven by a supply reel servo 27 and a takeup reel servo 26. The takeup reel servo 26 and the supply reel servo 27 operate in conjunction with tape position sensors 24 and 28 and tape speed tachometers (not shown) to maintain one loop 13 in the shortened position and the other tape loop 14 in the lengthened position as indicated in FIG. 1. When the tape direction is reversed, a short loop is maintained in chamber 25 and a long loop in chamber 15 as indicated by the dotted lines. Thus, as explained in the aforementioned patent application, the tape loops are maintained in optimum states for quick reversal of tape direction, because the storage capacities of the vacuum chambers are used to the utmost. The tape is driven past the read/write head 20 in either direction in accordance with command information received by pinch roller actuators 23 and 29 which operate in conjunction with the other tape position control means already described.

Devices in accordance with this invention utilize a pair of staggered posts between each vacuum chamber and the capstan drive. As best seen in FIG. 2, a first fixed post 33 is mounted near the exit of vacuum chamber 15 in close but spaced apart relation to a fixed second or guide post 32 in such manner as to provide an optimum self-adjusting friction on the tape. The second post 32 is provided with a flange or shoulder (not shown in FIG. 2) for lateral guiding of the tape. A similar first fixed post 31 is disposed in like fashion adjacent a second guide post 30 at the exit of the other chamber 25. The term "exit" is used to refer to the position at which tape is withdrawn from a vacuum chamber for supply to the capstan drive system. In each case the tape passes in a sinuous path on one side of the fixed second posts 30 or 32 and on the other side of the associated fixed first post 31 or 33 to provide oppositely directed wraparound angles. The larger angle of wrap is around the flanged second posts 30 and 32 nearer the capstan drive, and the linear tape path across the capstans lies tangential to the surfaces of the two second posts.

With the tape 11 going into the right-hand chamber 25, for example, very little frictional restraint is added in the tape path because of the cooperative action of the second post 30 and the first post 31. In this instance the tape tends to lie loosely about the second post 30 as it is drawn into the chamber 25. Where the tape is being drawn out of the chamber, however, the first post 31 and the second post 30 operate to draw the tape more tightly against the second post 30 about the entire wraparound angle, thus materially increasing frictional restraint.

The fixed second or guide posts 30 and 32 may each have inner and outer flanges for guiding the tape, as shown. However, it should be understood that the tape may be guided by separate means elsewhere in the tape path if the flanges are omitted from the posts 30 and 32.

Referring now specifically to FIG. 2, further details of substantially unidirectional frictional devices in accordance with the invention are illustrated. For superior results, the first fixed post 33 is positioned relative to the second fixed post 32 to provide a predetermined wraparound angle of the tape around the second post 32. The wraparound angle is in each case a function of the coefficient of friction $\mu$ between the tape surface and the fixed posts as shown by the following expression for the magnitude of the total frictional force $F_1$:

$$F_1 = T_1(e^{\mu\theta_1} - 1) \tag{1}$$

where $T_1$ represents the tension on the tape in the chamber and $\theta_1$ is the total wraparound angle on both the fixed post and the fixed guide post. Therefore, for a given value of tension $T_1$ and coefficient of friction $\mu$, the magnitude of the frictional force $F_1$ increases as the total wraparound angle $\theta_1$ increases. In a practical embodiment in which the posts have hard polished surfaces in contact with the tape, a wraparound angle of substantially 140° has been found to give optimum results with reasonably satisfactory results being achieved with wraparound angles of between 130° and 150°.

In operation, the staggered post arrangement of the present invention provides frictional forces in the tape path which are self-adjusting depending upon the upstream tape tension, that is, the tension on the tape in the direction opposite to the direction of tape travel. The greater frictional force is always supplied upstream of the capstan driving member. This is a distinct advantage over constant friction devices, which derive a frictional force from a constant normal force, and the single fixed post arrangements previously employed, which are generally incapable of developing sufficient frictional forces to stop the tape. It should be understood that some low friction is always present, although these frictional devices may properly be described as undirectional or substantially unidirectional in action.

When tape is being fed into a chamber, the pressure differential on the tape within the chamber must be large enough to pull it into the chamber to keep the tape in tension. If the friction between the capstan driving member and the chamber is high enough to counteract the pulling force within the chamber, the tape tension between the chamber and the capstan driving member goes to zero which often results in a buckling condition. On buckling, the tape might well break or stretch excessively, due either to catching or the introduction of unusually high tension transients. However, with the staggered post arrangement of the present invention, this undesirable series of events is avoided because of the self-adjusting frictional force which results from the fact that the frictional force F is directly proportional to the upstream tension $T_1$, as shown in Equation 1. Therefore, even should the upstream tension suddenly go to zero, the frictional force on the tape would also become zero, so that the pressure differential within the chamber is always large enough to pull the tape into the chamber and back into tension to prevent tape buckling.

While substantially identical cylindrically shaped posts of such metals as steel will in most instances operate satisfactorily, substantial frictional heat may be generated at the fixed posts in high performance systems, especially during periods of continuous operation. Under these conditions, the high wraparound angle about the second post can cause it to become heated to a high enough temperature for the contacting tape to acquire a slightly gummy surface, resulting in extreme friction. Some tape binders will break down under these conditions leaving hydrochloric acid as a byproduct which will destroy the guide surface. However, this harmful heating can be avoided by providing a staggered post arrangement as shown in the detailed illustrations of FIGS. 2, 3 and 4.

As illustrated therein, the first post 33 is made somewhat larger in cross-sectional diameter than the cross-sectional dimension of the second post 32. In addition, that side of the second post 32 which contacts the tape is given an involute or logarithmic spiral shape providing a gradually changing curve having the largest radius of curvature at the point at which the tape leaves the guide and extends toward the pinch roller 22. Shaping of the second fixed post 32 in this manner acts to more evenly distribute the frictional forces exerted over a larger area of the post surface, resulting in low contact shearing stresses and pressure. With a circular guide post the temperature may become excessive due to the large frictional forces and heating occurring along the line where the tape leaves the post toward the pinch roller. The post is made of a highly heat conductive material to provide for rapid transfer of heat generated by friction to the surrounding air or to a heat sink to which it is directly coupled.

In particular, the post material is a yellow brass alloy having high heat conduction and exhibiting good strength and stiffness.

The involute curve is used on the second post in order to make the normal pressure between the tape and post surfaces, and thus the friction, more uniform. It may be shown, by reference to FIG. 5, that the variation in pressure is exponential in nature, so that highest friction exists at the point at which the tape is about to leave the first post when traveling in the direction of the capstan.

Let the tape wrap around the guide with an angle from $\theta_1$ to $\theta_2$, and let $T_1$ be the upstream tension and $T_\theta$ the tension required to pull the downstream tape when motion impends. Taking a differential element of tape through angle $d\theta$, and, then, looking at the differental element, two equations can be written for the lateral forces F and the normal forces N:

$$dF_\theta = \tau_\theta R_\theta d\theta \qquad (2)$$

and $$dN_\theta = P_\tau R_\theta d\theta \qquad (3)$$

where $dF_\theta$ represents the lateral frictional force on the tape over the angle $d\theta$, $dN_\theta$ represents the normal force on the tape over the incremental angle $d\theta$, $\tau_\theta$ represents the shearing stresses produced at angle $d\theta$, and $R_\theta$ represents the radius of curvature R at the angle $d\theta$.

Now, with the system in equilibrium, the sum of the lateral forces acting on any section of the tape will be equal to zero. Therefore, over the angle $d\theta$ $$T_\theta + dT_\theta - dF_\theta - T_\theta = 0 \qquad (4)$$

where $dT_\theta$ represents the difference in tension across the incremental angle $d\theta$. Thus, $$dT_\theta = dF_\theta \qquad (5)$$

Also, the sum of the normal forces will be equal to zero with the system in equilibrium. Therefore, over the angle $d\theta$ $$dN_\theta - T_\theta \sin\frac{d\theta}{2} - (T_\theta + dT_\theta)\sin\frac{d\theta}{2} = 0 \qquad (6)$$

Neglecting the small second order term $dT_\theta \sin d\theta/2$, then $$dN_\theta = 2T_\theta \sin\frac{d\theta}{2} \qquad ($$

which for small angles becomes $$dN_\theta = T_\theta d\theta \qquad (8)$$

Now, assume, as in Equation 1, that $$dF_\theta = \mu dN_\theta \qquad (9)$$

Then, $$\tau_\theta = \mu P_\theta \qquad (10)$$

from Equations 2 and 3.

Now using Equations 5, 8 and 9, $$dT_\theta = \mu T_\theta d\theta \qquad (11)$$

which is then integrated over the wraparound angle $\theta$ $$\int_{T_1}^{T_\theta} \frac{dT_\theta}{T_\theta} = \int_{\theta_1=0}^{\theta} \mu d\theta \qquad (12)$$

which yields $$\ln\frac{T_\theta}{T_1} = \mu\theta \qquad (13)$$

Therefore, $$T_\theta = T_1 e^{\mu\theta} \qquad (14)$$

Now, substituting 8 into 3, $$T_\theta d\theta = P_\theta R_\theta d\theta \qquad (15)$$

and $$P_\theta = \frac{1}{R_\theta} T_\theta \qquad (16)$$

From 10 and 16, it may be seen that $$\tau_\theta = \frac{\mu}{R_\theta} T_\theta \qquad (17)$$

Now substituting 14 into 16 and 17:

$$P_\theta = \frac{T_1}{R_\theta} e^{\mu\theta} \qquad (18$$

and $$\tau_\theta = \frac{\mu T_1}{R_\theta} e^{\mu\theta} \qquad (19)$$

Therefore, from Equations 18 and 19, it is seen that both $P_\theta$ and $\tau_\theta$ are proportional to $$\frac{e^{\mu\theta}}{R_\theta}$$

and the exponential term $e^{\mu\theta}$ increases with increasing $\theta$. In order to reduce the shearing stresses at any point, the radius $R_\theta$ may be increased.

Ideally, the frictional force should be kept constant over the entire area of contact between the tape and the post. This may be accomplished by providing a contour for the wraparound portion of the post which has a logarithmic spiral or involute shape wherein the radius of curvature is given by $$R_\theta = R_1 e^{\mu\theta} \qquad (20)$$

wherein $R_1$ is the radius at $\theta_1$ where $\theta$ equal zero. Substituting 20 into 19, it may be seen that the shearing stresses $\tau_\theta$ on the tape become a constant for the entire wraparound angle $$\tau_\theta = \frac{\mu T_1}{R_1} \qquad (21)$$

Therefore, the frictional force over the wraparound surface is constant and independent of the angle $\theta$.

In addition, the surface of the post is provided with a thin layer of extremely hard material as most highly conductive materials are soft and prone to wear quickly due to abrasion. The hard layer, while being less conductive than the post material, will still provide rapid heat dissipation to the post material and consequently the air or heat sink coupled to the guide material because it is so thin. In particular, a plated layer of hard chromium one to a few mils thick may be uniformly plated to the guide material and polished to an approximately four microinch surface finish to provide a smooth wear resistant surface. A one mil thickness is preferred because it minimizes obstruction to conduction of heat. Accordingly, the staggered post arrangement of this invention may be employed with high performance systems such as may be required to run continuously in a single direction for substantial intervals.

To facilitate rapid stopping of the travel of the tape, a pair of solenoid brake devices 40 and 44 may be utilized. The solenoids 40 and 44 may operate in response to pulse signals derived from the command signals received from the tape program. For example, when the tape 11 is being moved in the forward direction by the capstan 16 and a "stop" command signal is received, the pinch roller 22 is disengaged, the plunger 42 on the other side is momentarily actuated by a pulse signal in response thereto and a brake pad 43 on the end of the plunger taps the tape 11 against plate 41, thereby braking the tape movement by dissipating much of the kinetic energy of the tape.

Devices in accordance with the invention, in providing substantially higher frictional action when tape is being drawn out of a chamber than when it is being fed in, are also useful in preventing tape "creep" in tape transport devices, especially in those systems which utilize tapered vacuum chambers, as illustrated in FIG. 1. With this type of chamber, "creep" tends to occur in the static condition with one loop short and the other long in view of the fact that there is greater surface area exposed to the pressure differential by the short loop than by the long loop. The tape therefore tends to pull or "creep" in the direction of the short loop. The frictional action provided by the cooperative action of the guide posts and the fixed posts may be used to prevent such "creep" if maintained in excess of the force differential on the loops.

The device of this invention thus provides a simple yet highly effective means for controlling tape tension, tape friction and tape movement in a tape transport mechanism. Unilateral frictional action is automatically provided so that substantial frictional action is presented only at the exit to a vacuum chamber by the staggered posts when tape is being drawn from such chamber and substantially low friction is presented by the staggered posts when tape is entering the chamber associated therewith.

While the invention has been described and illustrated in detail, it is to be clearly understood that this is intended by way of illustration and example only, and is not to be taken by way of limitation, the spirit and scope of this invention being limited only by the terms of the following claims.

What is claimed is:

1. A tape transport system comprising a pair of tape reels, a pair of differential pressure chambers symmetrically placed relative to the reels for forming loops in the tape, the chambers having varying cross-sections, a pair of tape loop servo means, each responsive to the position of the tape loop in a different chamber and coupled to rotate the adjacent tape reel to maintain a controlled loop in the chamber during tape movement, a pair of capstan drive means positioned along the tape path between the chambers, and a pair of stationary frictional means positioned along the tape path, each frictional means being between a different chamber and the closest adjacent capstan drive means, and each providing substantially greater friction to tape being drawn from the associated chamber than to tape being fed to the associated chamber.

2. In a tape transport mechanism for transporting tape in a path from a supply reel to a takeup reel, a pair of tape buffer means interposed between said supply and takeup reels, one of said tape buffer means being adjacent to said supply reel, the other of said tape buffer means being adjacent to the said takeup reel, and unilateral frictional means associated with each of said tape buffer means interposed in said tape path, said unilateral frictional means comprising first and second fixed posts, the tape being passed between said first and second posts, said first post being positioned relative to said second post to cause said tape to have a wraparound angle thereabout in excess of 90° of the circumference of said second post.

3. The device as recited in claim 2 wherein said first post is positioned to cause the tape to be in contact with approximately 140° of the circumference of said second post, said second post having a smooth metal surface in contact with the tape.

4. In a tape transport mechanism for transporting tape in a path from a supply reel to a takeup reel, a pair of vacuum chambers interposed between said supply and takeup reels, one of said chambers being adjacent to said supply reel, the other of said chambers being adjacent to said takeup reel, capstan drive means interposed between said chambers for driving said tape between said reels, and unilateral frictional means associated with each of said vacuum chambers interposed in said tape path between said capstan drive means and the associated chamber, each of said unilateral frictional means comprising a pair of staggered fixed posts, the tape being wrapped around said fixed posts, a first of said fixed posts being positioned relative to the second fixed post to cause said tape to contact said second post over an angle in excess of 90° of the circumference of said second fixed post, said second fixed post being positioned in the tape path nearer the capstan drive means than said first fixed post.

5. A unidirectional frictional element for moving tape members comprising a first fixed post, means including a second fixed post adjacent the first post for providing a wraparound angle of the tape member of at least 130° about the second post, wherein at least the second post comprises a heat conductive base member and a thin high hardness outer surface, and the second post presents a surface in contact with the tape which follows an involute curve.

6. In a tape transport mechanism for transporting tape between supply and takeup reels, tapered vacuum chambers associated with each of said reels, said chambers being positioned in the tape path between said reels, capstan means for driving the tape from one of said chambers to the other of said chambers, the chambers being disposed at substantially normal angles to the tape path across the capstan means, servo means for maintaining a short tape loop in the vacuum chamber associated with said supply reel and a long tape loop in the vacuum chamber associated with said takeup reel, and a pair of guide tensioning devices each comprising a fixed guide post for each of said chambers interposed along the tape path between said capstan means and the associated chamber and an additional fixed post spaced apart from each of said fixed guide posts, the tape wrapping around said fixed guide posts and said second additional fixed posts in opposite directions, said additional fixed posts being positioned relative to said fixed guide posts to cause the tape to wrap around a substantially larger angle on the peripheral surface of said fixed guide posts.

7. The invention as set forth in claim 6 wherein said additional fixed posts are positioned relative to said guide posts to cause said tape to contact said guide posts around an angle of approximately 130° to 150° on the peripheral surface of said fixed guide posts.

8. A unidirectional frictional device for stabilizing a tape path wherein the tape is driven bidirectionally by a driving means comprising first and second posts disposed in the tape path so that the tape has a first wraparound angle in one direction around the first post and a second wraparound angle in the other direction around the second post, said second wraparound angle being substantially greater than said first wraparound angle, and wherein said second post is disposed in said tape path closer to said drive means than said first post, such that the frictional force exerted between the moving tape and the surfaces of the first and second posts is determined by the upstream tape tension, said frictional force being substantially larger when the tape is being moved in the direction from said posts toward said driving means.

9. The unidirectional frictional device of claim 8 wherein said second post has a surface contacting the tape in the form of an involute curve having the greatest radius of curvature at the region at which the tape leaves the guide post when traveling toward the driving means, the wraparound angle of the tape about the second post is approximately 140°, the surface of greatest radius of curvature of the second post lies tangential to the tape path to the driving means, wherein said first post having a substantially larger diameter than said second post, wherein both of said first and second posts are of a highly heat conductive material, and wherein both of said first and second posts have relatively thin hard surface coatings whereby excessive heating of the post and resulting tape damage due to frictional forces is prevented.

10. The device of claim 9 wherein said tape transport further includes solenoid actuated brake means for momentarily engaging said tape upstream of the driving means, said braking means being positioned along said tape path between said driving means and each associated pair of fixed posts.

11. In a tape transport system wherein the tape is driven bidirectionally by a tape driving means, a device for applying an increased frictional force upstream of the driving means independent of the direction of tape travel comprising two pairs of fixed posts, each pair being disposed in the tape path on opposite sides of the driving means, each pair including a first fixed post and a second fixed post, said second fixed post being disposed in the tape path closer to the driving means than the first fixed post, said first fixed post of each pair being positioned relative to said second fixed post to introduce a sinuous tape path providing a high wraparound angle around said second fixed post and a lower wraparound angle in the other direction around said first fixed post, whereby the frictional forces exerted by each of said pairs of fixed posts is determined by the tension exerted on the tape upstream of each pair of fixed posts.

12. A unidirectional frictional device for stabilizing a tape path wherein the tape is driven bidirectionally by a driving means, comprising first and second posts disposed in the tape path so that the tape has a first wraparound angle in one direction around the first post and a second wraparound angle in the other direction around the second post, said second wraparound angle being substantially greater than said first wraparound angle, and wherein said second post is disposed in said tape path closer to said drive means than said first post, said first post having a substantially cylindrical surface with a constant radius of curvature engaging said tape, said second post having an involute surface engaging said tape, said involute surface providing a constantly increasing radius of curvature toward the region at which the tape path is closest to the driving means, whereby the frictional force exerted between the moving tape and the surfaces of the first and second posts is determined by the upstream tape tension, said frictional force being substantially larger when the tape is being driven in the direction from said posts toward said driving means.

13. The unidirectional frictional device of claim 12 wherein said first post has a substantially larger cross-sectional dimension than said second post, said first and second posts are of yellow brass having a hard chrome plating of approximately one mil thickness and an approximately four microinch surface smoothness, and wherein said wraparound angle about said second post is approximately 140°.

References Cited by the Examiner

UNITED STATES PATENTS

| | | | |
|---|---|---|---|
| 2,321,426 | 6/1943 | Rouan et al. | 226—197 X |
| 3,062,464 | 11/1962 | Moose et al. | 242—55.12 |
| 3,091,409 | 5/1963 | Goodale | 226—97 X |
| 3,108,728 | 10/1963 | Selsted. | |
| 3,137,453 | 6/1964 | Wooldridge | 242—55.12 |

FRANK J. COHEN, *Primary Examiner.*

GEORGE F. MAUTZ, *Examiner.*